United States Patent
Langendorfer et al.

[15] 3,705,760
[45] Dec. 12, 1972

[54] FACE GOGGLES

[72] Inventors: Walter J. Langendorfer, Lansdowne; David W. Coffin, Sr., Prospect Park, both of Pa.

[73] Assignee: Langendorfer Plastics Corporation, Lansdowne, Pa.

[22] Filed: March 4, 1971

[21] Appl. No.: 120,961

[52] U.S. Cl. ............351/44, 2/14 B, 2/14 C, 2/14 J, 351/116, 351/156
[51] Int. Cl. ....................G02c 7/10, A61f 9/02
[58] Field of Search......351/41, 44, 45, 46, 118, 116, 351/136, 138, 156, 157, 43; 2/14 R, 14 A, 14 B, 14 C, 14 D, 14 J, 14 T, 14 V, 14 W, 14 L, 14 M

[56] References Cited

UNITED STATES PATENTS

| | | | |
|---|---|---|---|
| 3,526,449 | 9/1970 | Bolle et al. | 351/44 X |
| 2,799,862 | 7/1957 | Rowe | 2/14 C |
| 1,176,313 | 3/1966 | Pfund | 351/44 X |
| 3,155,982 | 11/1964 | Baratelli | 351/44 X |
| 2,819,650 | 1/1958 | Seron | 351/156 |
| 1,206,132 | 11/1916 | Otte | 351/46 UX |
| 2,614,255 | 10/1952 | Ellis | 2/14 V UX |

FOREIGN PATENTS OR APPLICATIONS

| | | | |
|---|---|---|---|
| 200,827 | 11/1958 | Germany | 2/14 C |
| 510,802 | 8/1939 | Great Britain | 2/14 K |
| 1,488,442 | 6/1967 | France | 2/14 M |
| 1,432,780 | 2/1966 | France | 351/45 |

Primary Examiner—David Schonberg
Assistant Examiner—John W. Leonard
Attorney—Jackson, Jackson and Chovanes

[57] ABSTRACT

Face goggles for eye and face protection in the form of a transparent plastic, for instance acrylic, spherical face plate having individual viewing spheres positioned over the eyes of the wearer, whereby wide angle vision and full protection are achieved.

7 Claims, 14 Drawing Figures

PATENTED DEC 12 1972

INVENTORS
DAVID W. COFFIN, SR.
WALTER J. LANGENDORFER
BY
Jackson, Jackson & Chovanes
ATTORNEYS.

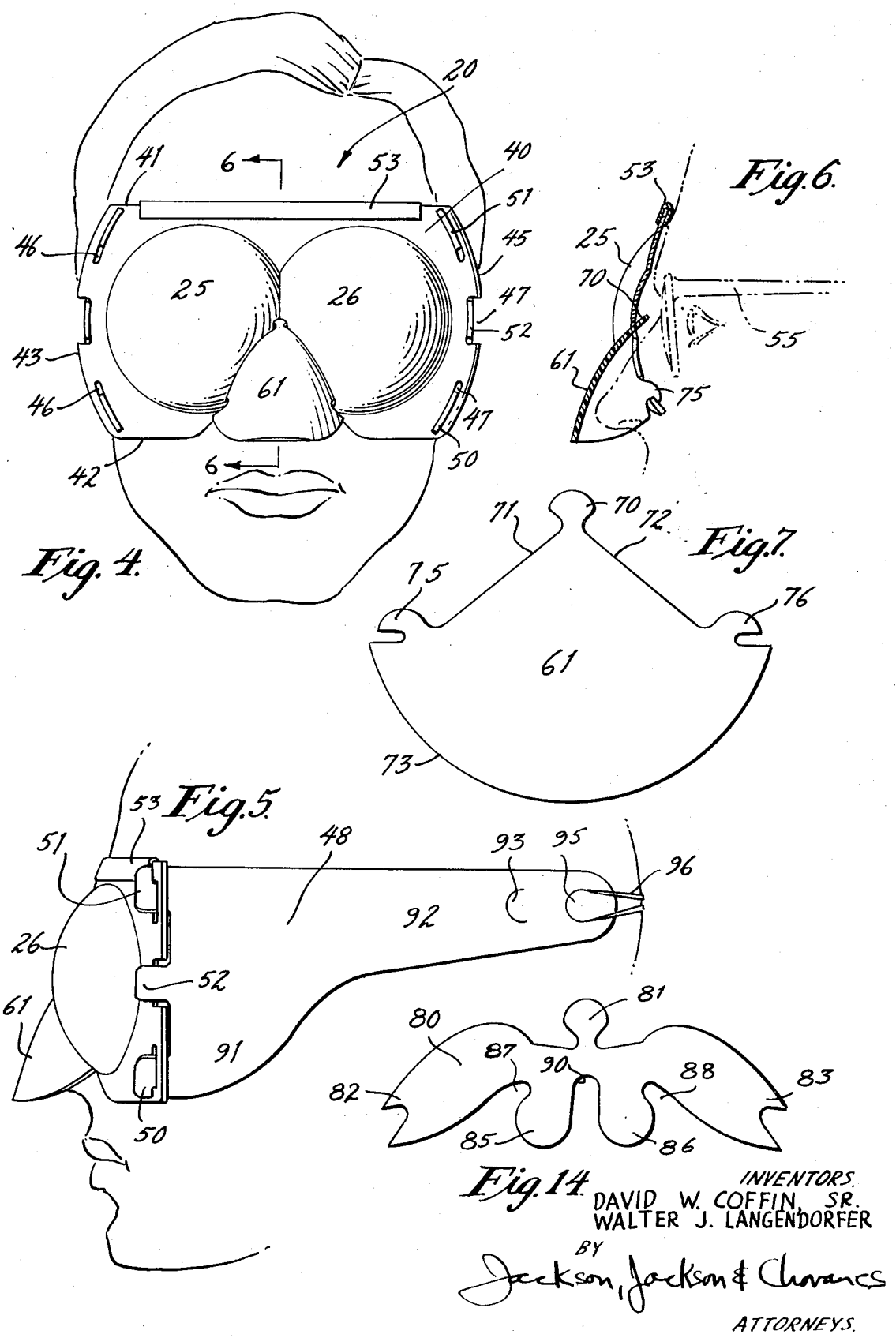

FACE GOGGLES

BACKGROUND OF THE INVENTION

1. Field of the Invention

The invention pertains to devices for protecting the face and eyes of the wearer, both for use over prescription lenses, and without prescription lenses.

Face and eye protection is desirable and necessary in various forms of activity; for instance: in operating motor vehicles such as motorcycles wherein the operator is moving at fast speeds and is exposed to impurities in the air including solids which may strike the eye ball; in industrial activity such as grinding and the like where fragments are thrown through the air; and in other forms of activity both working and playing, wherein there is danger to the face and eye.

Additionally, there may be a need or desire to shade the eyes against strong light, such as in sun bathing, welding, or when exposed to intense illumination, such as spotlights.

Finally, in some cold weather activity, particularly in high winds, face and eye warmth is often necessary.

2. Description of the Prior Art

Numerous forms of goggles have been developed and used in the prior art. These generally are formed of two relatively flat eye pieces each of which is positioned in front of the eye by means of metallic or plastic frames or rims which surround and support the eye piece, a nose support in the form of a plastic or metallic inverted U which rides on the bridge of the nose, and wire or plastic side pieces which extend from the sides of the frame and rest on the ears or extend around the back of the head of the wearer.

In the above described form of goggle, the face, in areas other than that covered by the goggles, is exposed.

Additionally, the sides of the eyes are exposed and fragments may readily pass laterally in the space between the lens and the face of the wearer, and strike the wearer in the eye. Efforts have been made to prevent such a happening and side guards have been installed along the sides of the lenses. However, these block out a substantial portion of the wearer's vision and he, in effect, feels he is wearing blinders. Efforts have been made to overcome this interference with side vision while still maintaining protection to the eye, principally by curving the lens to achieve such improved vision while maintaining protection. However, this results in distortion to the vision because of imperfections at the curved portion of the lens and the wearer experiences an uncomfortable and irritating experience when he attempts to view objects laterally.

SUMMARY OF THE INVENTION

The present invention achieves face protection and full eye protection to the wearer while providing distortion-free wide angle vision and optionally a high degree of shading from sun or other reflected objects. Such trouble-free vision and improved protection is achieved by the use of a curved face plate, in effect a surface portion of a sphere, which has formed therein spheres which allow vision through any angle, with a minimum of distortion, while providing protection and full coverage in front as well as sides of the eyes and face.

The face goggle outline, as viewed from in front, may be of a generally spherical outline, a modified rectangular outline, or an oval outline. Viewing spheres are positioned and shaped in the face plate in all of the face goggle outline forms to provide clear vision and full protection.

Alternative means are available for supporting the face goggle on the nose of the wearer and from either the ears of the wearer or by a band which extends completely around the head of the wearer.

A nose guard is available to be optionally worn with the face goggle to provide protection to the nose of the wearer.

Slots in the face piece of the face goggle receive flexible tabs on the ear support or headband, depending on which is used, so that the goggles are easily and quickly assembled.

A purpose of the present invention is to provide a face goggle which gives distortion-free wide angle vision in combination with full protection to the eye and optionally a high degree of shading from the sun or other reflected objects.

A further purpose is to utilize free blown spheres in a clear plastic sheet, and to provide a face goggle totally free of distortion which offers protection.

A further purpose of the invention is to provide a plastic of any color or shading in a face goggle.

A further purpose of the invention is to provide optionally substantial face protection in a full vision goggle.

A further purpose of the invention is to provide an intersection of a pair of spheres in a face goggle to allow prescription lens glasses to be worn beneath the goggle.

A further purpose is to utilize a face piece in the form of a free blown sphere, in combination with a free blown hemisphere in the face piece, to provide a goggle which is virtually free of interference with vision.

A further purpose is to provide a distortion-free face goggle formed in a simple and economical manner by free blowing.

A further purpose is to provide an optionally different face goggle outline in a goggle, and a different means of support from the face and head of the wearer.

Further purposes appear in the specification and in the claims.

BRIEF DESCRIPTION OF THE DRAWINGS

FIG. 1 is a front elevational view of the basic form of the goggle of the invention.

FIG. 2 is a view taken on the line 2—2 of FIG. 1.

FIG. 3 is a section taken on the line 3—3 of FIG. 1.

FIG. 4 is a front elevation of one form of the face goggles of the invention, having a generally rectangular outline, showing them as actually worn.

FIG. 5 is a side elevation of the face goggles of FIG. 4 showing them as worn.

FIG. 6 is a section 6—6 on FIG. 4, showing the face goggles on a user wearing spectacles, with the user and spectacles shown in phantom.

FIG. 7 is a flat pattern of the nose guard shown in FIGS. 4, 5, and 6.

FIGS. 8, 9, 10, and 11 show various forms of the invention.

FIG. 8 is a front elevational view of the goggle wherein the face plate is of circular form.

FIGS. 9 through 11 are front elevational views of face goggles of generally rectangular outline having various shadings.

FIG. 14 is a plan view in flattened form of the nose support shown in FIGS. 12 and 13.

DESCRIPTION OF THE PREFERRED EMBODIMENT

Figure 1:
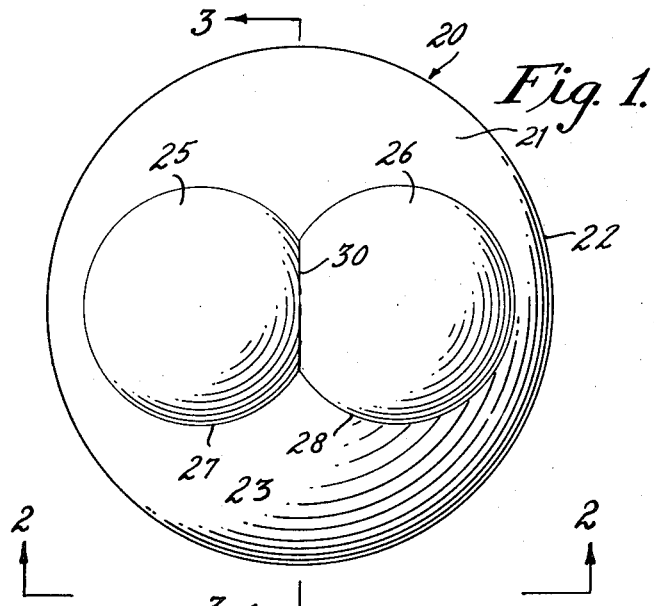
FIGS. 1 through 3 shows the basic form for all types of face goggles and embodiments herein.
Figure 3:
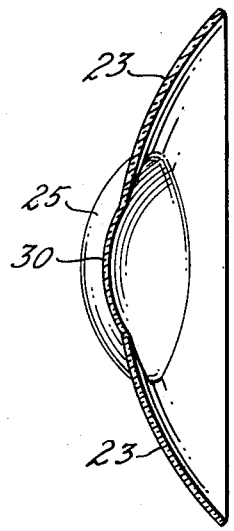
Figure 2:
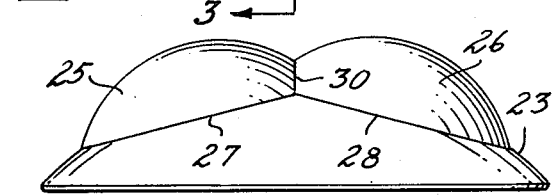

FIGS. 1, 2 and 3 show the basic form of the face goggle construction of the invention. The goggles 20 include a face plate sphere 21 having a circular outline 22 as viewed in FIG. 1, and a spherical contour 23 as viewed in FIGS. 2 and 3. In other words, the face plate is a surface segment of a sphere. Goggles 20 are formed desirably by air pressure or the like free blowing the liquid acrylic plastic into a configuration which yields the desired shape. The acrylic is desirably tinted, for instance blue, to reduce glare.

Extending from the face plate sphere 21, and integral therewith, are spheres 25 and 26. The viewing spheres 25 and 26 are circular at their base as viewed in FIG. 1, forming circles 27 and 28. The spheres intersect at 30 to form a portion, as best seen in FIG. 2, which extends outwardly slightly from the projected contour of the spherical face plate 21. This intersection 30 is seen in section in FIG. 3 and forms additional clearance space between the wearer's face and the goggle in the vicinity of the nose of the wearer. Such clearance permits the user to wear spectacles.

The face plate sphere 21 is desirably one having a sphere radius of approximately 5 inches.

The viewing spheres 25 and 26 which are located within the face plate sphere 21 are desirably of approximately a 1¾ inch diameter.

The face plate sphere 21 shown in FIGS. 1, 2 and 3 is the basic sphere and is modified as desired.

Figure 8:
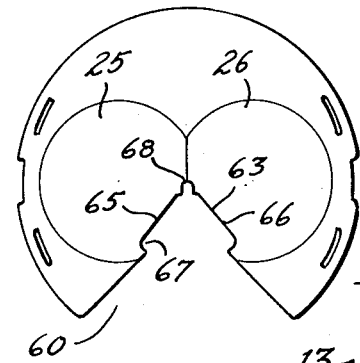

As seen in FIG. 8, the face goggle 20 of the invention has the face plate sphere 21 of that shown in FIGS. 1 through 3, except for the nose cut out 60. The face goggle outline when viewed from the front is of circular outline 22. Notches 46 and 47 are formed along the edges of the face plate sphere 21.

As seen in FIG. 4 through 6, another form of goggles 20 of the invention is shown. The face plate 40, in this instance, is the basic face plate sphere 21 shown in FIGS. 1 through 3, with the upper portion of the sphere and the lower portion of the sphere omitted. Such face plate 40, when viewed from the front, as in FIG. 4, is of a substantially rectangular appearance having a top 41, a bottom 42 and sides 43 and 45. Suitable notches 46 and 47 are placed along the sides of the sphere so that a head band 48, as best seen in FIG. 5, can be engaged therein. The head band desirably is of a plastic material, such as 1/32 inch thick polyethylene, of a flexible type, having upper and lower key tabs 50 and 51 and middle tab 52 which are flexed to engage in slots 46 and 47. It will be seen that the tabs 50, 51 and 52 on the head band 48 are biased under the stiffness of the head band 48 so that they interlock with the face plate 40. Such headband and connection are also used with the form shown in FIG. 8. Viewing spheres 25 and 26 of the type described in FIG. 1 extend from the face plate 40. Desirably, a relatively soft guard strip, or cushion strip, 53 is slid over the top edge 41 of the face plate to form a relatively comfortable upper rest on the face plate 40, which extends across the forehead of the wearer.

As seen in FIG. 6, prescription lenses, or spectacles, 55 can be readily worn beneath the goggles 20 with no interference thereto.

The goggles of the invention 20 all have a nose opening 60 which is used with a nose guard 61 or a nose support 80. The nose opening 60 includes a triangular divergent portion 63 which has opposed sides 65 and 66 diverging from a central point at the midpoint of the intersecting viewing spheres 25 and 26. There is a small step 67 in each of the sides 65 and 66 for receiving the tabs of the nose guard 61. Also, at the apex of opening 63, there is a notch 68 for receiving a tab 70 from the nose guard 61.

In FIG. 7, a form of nose guard 61 is shown. In projected, plane, extended, form, the guard 61 has divergent straight sides 71 and 72 and a circular segment 73. Locking tabs 75 and 76 are formed at the ends of the arc 73. The guard 61 is formed, desirably, of a relatively flexible plastic, of, for instance, 1/32 inch thick polyethylene, similar to head band 48, so that the nose guard 61 can be flexed and then locked into position on the face plate as shown, for instance, in FIGS. 4, 5, and 6.

In FIG. 14 there is shown an alternative type of nose support 80. The nose support 80 has a central tab 81 which suitably engages in notch 68 of the face plate and engaging tabs 82 and 83, which engage into notches 67 in the face plate. Nose guard 80 has nose resting portions 85 and 86 which bend or flex when resting on the nose of the goggle wearer. Cut out portions 87 and 88 and 90 provide means for the various portions of nose guard 80 to flex and conform to the shape and size of the wearer's nose.

It will be noted that guard 61 of FIG. 7 provides a more complete coverage of the nose of the wearer and is desirably used when the goggle is utilized in industrial operations where the danger of flying objects causing trouble is greater.

In FIGS. 4 and 5, the head band 48, which also constitutes a side guard, is desirably of 1/32 inch thick polyethylene and has a full portion 91 and a reduced thickness portion 92. At the rear thereof there is a series of tabs or pushouts 93 and 95 which are so formed to engage a rubber band 96 which extends around the back of the head of the wearer and holds the goggle in place.

Figure 12:
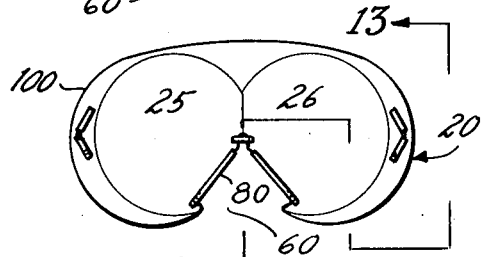
FIG. 12 is a front elevational view of a modified form having a generally oval face plate outline.
Figure 13:
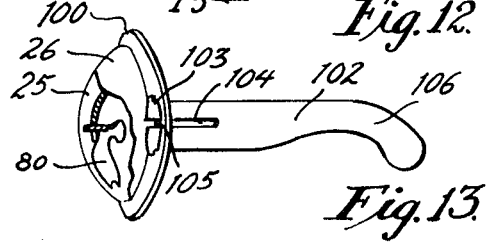
FIG. 13 is a partial broken away jump section taken on the line 13—13 of FIG. 12, with the section being taken at the area of the nose support.

In addition to the forms of face goggle so far described, having a circular outline face plate, as in FIG. 8 and a relatively rectangular outline face plate as in FIGS. 4, and 9 to 11, the goggle may have an oval outline 100 as seen in FIGS. 12 and 13. Goggle 100 is of the same shape and form as that shown in FIG. 1, except that that part of the face plate 21 is omitted which is necessary to form the oval outline of the goggle 100. The oval outline face plate of FIGS. 12 and 13 extends over a smaller portion of the face, and hence offers less protection to the face. The viewing spheres 25 and 26 are the same as in the other alternatives described, and hence visibility is not affected, Ear supports 102 have tabs 103 which can be forced together around slit 104 to engage into slot 105 in goggle 100. The nose support 80 is shown in place in the goggles of the embodiment of FIGS. 12 and 13. It should be noted that whereas the nose guard 61 extends outwardly of the goggle, the nose support 80, as shown in detail in FIG. 14, extends inwardly of the face plate as shown in FIGS. 12 and 13 and forms a nose support for resting on the nose of the wearer. Curved portions 106 of the ear supports 102 curve over and rest on the wearer's ears.

Figure 9:
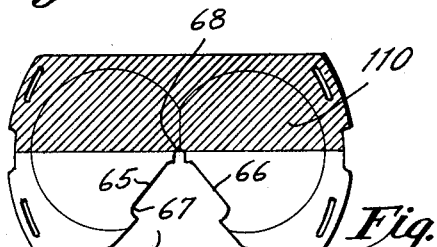
Figure 10:
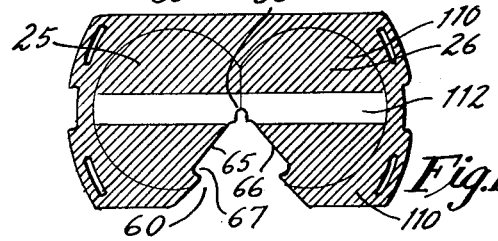

There is further shown in FIGS. 9 through 11 certain additional modifications. In FIG. 9 there is shown a form which has extending across thereof an opaque liner 110 which can be in the form of a sprayed-on metallic coating, such as an aluminum coating, which provides a shading for the eyes and permits vision through the lower half of the goggles. In FIG. 10 there is an embodiment shown with a clear slit 112 extending across the viewing spheres 25 and 26 of the goggle with opaque coating 110 extending over the remainder of the goggle. In FIG. 11 there is shown an embodiment with an opaque coating 110 over the entire goggle except for clear portions 115 which are shown in the form of crosses but permissably can be in any shape.

The diameter of the outline of the sphere as shown straight on, as in FIG. 1, is approximately of a 7 inch length. The center lines of the location at which the viewing spheres 25 and 26 are swung approximately conform to the distance between the eyes of the average person, for instance 3 inches.

Having thus described my invention, what I claim as new and desire to secure by Letters Patent is:

1. A face goggle for eye and face protection having
   a. a transparent plastic face piece in the form of a spherical segment, and
   a pair of transparent viewing sections integral with and formed within the face piece and positioned in front of the eyes of the wearer, each of said sections being a spherical segment of smaller radius than said face piece spherical segment, said face piece and viewing spheres being of one piece construction and made of acrylic plastic, and
   b. means for holding the face piece on the face of the wearer.

2. A goggle of claim 1 wherein the plastic is tinted.

3. A goggle of claim 1 having a nose guard attached thereto by tab means wherein the nose guard is formed of a flexible plastic sheet.

4. A goggle of claim 1 wherein the viewing spheres intersect and form a clearance section in the face piece whereby spectacles may be worn by the wearer.

5. A goggle of claim 1 wherein the face piece has a circular outline.

6. A goggle of claim 1 wherein the face piece has an oval outline.

7. A goggle of claim 1 wherein the face piece has a generally rectangular outline.

* * * * *